(12) United States Patent
Hosomi et al.

(10) Patent No.: US 8,036,533 B2
(45) Date of Patent: Oct. 11, 2011

(54) OPTICAL TRANSMITTER/RECEIVER MODULE

(75) Inventors: Kazuhiko Hosomi, Tachikawa (JP); Misuzu Sagawa, Tokyo (JP); Toshiki Sugawara, Kokubunji (JP); Masahiro Aoki, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 536 days.

(21) Appl. No.: 12/254,036

(22) Filed: Oct. 20, 2008

(65) Prior Publication Data

US 2009/0103923 A1 Apr. 23, 2009

(30) Foreign Application Priority Data

Oct. 22, 2007 (JP) ................................ 2007-273302

(51) Int. Cl.
*H04J 14/02* (2006.01)
(52) U.S. Cl. .......................................................... 398/79
(58) Field of Classification Search ..................... 398/73, 398/135, 138, 164
See application file for complete search history.

(56) References Cited

U.S. PATENT DOCUMENTS

| | | | |
|---|---|---|---|
| 2002/0197008 A1* | 12/2002 | Kim et al. | 385/24 |
| 2003/0152113 A1 | 8/2003 | Kropp | |
| 2006/0088246 A1* | 4/2006 | Han et al. | 385/47 |
| 2006/0274999 A1* | 12/2006 | Wu et al. | 385/92 |

FOREIGN PATENT DOCUMENTS

| | | |
|---|---|---|
| CN | 1206844 | 2/1999 |
| JP | 10-333599 | 12/1998 |
| JP | 2002-214705 | 7/2002 |
| JP | 2004-109313 | 4/2004 |
| JP | 2005-309370 | 11/2005 |
| JP | 2006-186243 | 7/2006 |

* cited by examiner

*Primary Examiner* — Ken Vanderpuye
*Assistant Examiner* — Jermaine Wilson
(74) *Attorney, Agent, or Firm* — Antonelli, Terry, Stout & Kraus, LLP.

(57) ABSTRACT

An optical element mounting substrate where a plurality of light emitting elements have been mounted on the same plane, a lens array for collimating a plurality of light emitted from the plurality of light emitting elements, and a wavelength multiplexing/demultiplexing device are prepared. The wavelength multiplexing/demultiplexing device has typically mounted both a wavelength selecting filter and a mirror on front and rear planes of a transparent substrate. These three components are mounted within a package at a desirable angle position. Optical axes of respective wavelengths of the wavelength multiplexing/demultiplexing device are determined based upon a thickness and an angle of the light emitting element mounting substrate, and are arrayed on a straight line of a horizontal plane. As a consequence, if the respective light emitting elements are arranged on the optical axes which are exclusively determined by a design work, then optical multiplexing/demultiplexing operations can be carried out.

12 Claims, 15 Drawing Sheets

OPTICAL TRANSMITTER/RECEIVER MODULE

INCORPORATION BY REFERENCE

The present application claims priority from Japanese application JP2007-273302 filed on Oct. 22, 2007, the content of which is hereby incorporated by reference into this application.

BACKGROUND OF THE INVENTION

The present invention is generally related to an optical module. More specifically, the present invention is directed to a structure of a multi-wavelength optical transmitter module which optically multiplexes a plurality of laser light having a plurality of wavelengths with each other and then transmits the multiplexed laser light, and also, directed to a structure of an optical receiver module which optically demultiplexes such a light whose plural wavelengths have been multiplexed so as to receive the demultiplexed light.

Semiconductor laser diode (LD) elements have been utilized in various sorts of technical fields such as information and telecommunication fields as compact light sources operable in higher efficiencies. Very recently, there are strong needs of technical ideas capable of providing laser diode light sources having a plurality of light emission wavelengths as compact light source mounted modules. Conventionally, the above-described technical needs have been made as light sources for wavelength multiplexing communications which employ light having plural wavelengths in optical communication fields. In addition thereto, LDs (laser diodes) of blue color series have been currently developed, and oscillatable wavelengths could be widened in blue color LDs. As a result, as reading/writing light sources of displays and optical disks, higher requirements for multi-wavelengths light source modules have been made even in wavelength ranges of visible light.

As one of application examples of the multi-wavelengths light source modules, there are light sources of laser projectors. Generally speaking, projectors imply such image display apparatuses which project images on screens, and the like, in response to image signals derived from various types of image supplying apparatuses (for example, computers etc.) so as to display the projected images. In general, as conventional projectors, the below-mentioned types of projectors are known, which have mainly employed transmission type liquid crystal panels, reflection type liquid crystal panels, or digital micromirror devices. On the other hand, laser projectors have been designed in such a system that while laser light is employed as light of light sources thereof, the laser light is scanned along a two-dimensional direction so as to display images. As a consequence, these laser projectors can be made compact, and can produce images having superior color reproduction, as compared with those as to the above-described other types of projectors. Conventionally, use places of projectors have been relatively limited only to, for example, meeting rooms, presentation rooms, living rooms of homes, and the like. However, since portable computers have been made compact and portable telephones equipped with higher functions have been marketed in the present stage, qualities and quantities of data which are portable for respective persons are considerably increased, so that these computers and portable telephones can be operated without restricting use places thereof. For example, there are some expectations as to development of ultracompact type projectors operable under low power consumption, which can be assembled in portable computers and portable telephones. As technical ideas related to laser projectors, for example, JP-A-2002-214705 has disclosed the below-mentioned color laser projector: That is, in this color laser projector, 3 sets of light emitted from 3 pieces of laser light sources having different light emission colors are scanned in the two-dimensional direction by optical scanning means which are different from each other, and then, 3 sets of the two-dimensionally scanned laser light are collected to each other in a synchronization manner so as to project color images. However, the color laser projector described in JP-A-2002-214705 has such a problem that since the plural sets of optical scanning means are required, whose total number is equal to that of the laser light sources, there is a limitation when the color laser projector is made compact.

Also, another technical idea has been proposed. That is, JP-A-2006-186243 has disclosed such a color laser projector that R (red), G (green), and B (blue) semiconductor LD (laser diodes) elements which are employed in light sources are stored in one package in order to improve compactness of the light sources and of optical systems thereof. However, in the color laser projector of the above-described JP-A-2006-186243, the light source are merely mounted in the proximity to each other, and three sets of the color laser light are not multiplexed with each other. As a result, the optical axes of the R, G, B laser diode elements are not coincident with each other. Under such a circumstance, in order to secure predetermined resolution, optical systems designed for respective wavelengths of the R, G, B semiconductor LD elements must be separately prepared. Otherwise, if a general technical idea is utilized in order to make the optical axes coincident with each other, then such an optical system as a dichroic prism and the like is required. Even if any of the above-described solving ideas is employed, there are certain limitations when a total number of optical components is reduced, and the optical systems are made compact.

SUMMARY OF THE INVENTION

As previously described, needs for using laser light having a plurality of light emission wavelengths by being multiplexed with each other have been increased, in which these laser light sources have been utilized in projectors as a first need. However, in the above-described conventional type of laser projector, while the plural light sources having the different wavelengths are separately prepared, the individual optical systems are assembled. Also, in the conventional method, plural sets of the laser light are multiplexed with each other by employing the dichroic mirror. These conventional system and method have such a drawback that the optical systems are made complex, and the quantity of optical components is increased. As a result, there are some limitations when the conventional systems are made compact and the cost thereof is reduced.

As a consequence, an object of the present invention is to provide a multi-wavelength optical transmitter/receiver module which can be made compact and can be manufactured in high yield, while the multi-wavelength optical transmitter/receiver module is capable of largely reducing a total number of structural components and a total quantity of mounting steps of a system in various sorts of application fields, for instance, projectors, optical transmission communications, information processing appliances, biological measuring fields and so on.

To solve the above-described problems, an optical multi-wavelength transmitter/receiver module, according to an aspect of the present invention, is featured by that while an optical element mounting substrate where a plurality of optical elements have been mounted on the same plane, and an optical wavelength multiplexing/demultiplexing device in which both a wavelength selecting filter and a mirror have typically been mounted on front and rear planes of a transparent substrate are prepared, these two components are mounted within a package in such an angle manner that an optical element mounting plane is located not parallel to a surface of the wavelength selecting filter. The optical elements having different use wavelengths from each other have been mounted at desirable positions on the optical element mounting substrate. The optical multiplexing/demultiplexing device is constituted in such a manner that while a substrate having a desirable thickness and one pair of parallel planes located opposite to each other is employed as a supporting substrate and has been made of a transparent material with respect to wavelengths of light, at least one sort of wavelength selecting filter is provided on one plane of the paired paralleled planes, and a mirror is provided on the other plane of the paired parallel planes in order to reflect thereon such a light having a wavelength which has not been selected by the wavelength selecting filter. In this case, windows for entering/projecting light are provided in these filter and mirror.

A description is made of operations of the optical module according to the present invention with reference to FIG. 2. FIG. 2 is a diagram for schematically indicating functions in such a case that the inventive idea of the present invention has been applied to an optical module by which three sets of color light from optical sources are optically multiplexed with each other, and then, the multiplexed light is emitted. This optical module has such a function that a plurality of light having wavelengths "$\lambda_1$", "$\lambda_2$", "$\lambda_3$" emitted from light emitting elements 11, 12, 13 respectively are optically multiplexed with each other under such a condition that the plurality of light pass through the same optical axis, and then, the multiplexed light is emitted outside the optical module. Concretely speaking, the light having the wavelength "$\lambda_3$" emitted from the light emitting element 13 along a vertical direction with respect to a substrate reaches a multiplexing/demultiplexing device 2. Since the multiplexing/demultiplexing device 2 has been mounted at an angle (not right angle) with respect to the optical axis, namely, at such an angle of "$\theta1$" (note that angle $\theta1$ is not equal to $2N\pi$. Symbol N=0, 1, 2, - - - ), the light having the wavelength "$\lambda_3$" is refracted by a predetermined refraction at the multiplexing/demultiplexing device 2, which is determined by a difference in refractive indexes. The light having the wavelength "$\lambda_3$" located within the multiplexing/demultiplexing device 2 is reflected on a mirror 8, and then, reflected light reaches a filter 7. Just under the filter 7, the light emitting element 12 for emitting the light having the wavelength "$\lambda_2$" has been provided. Both the light emitting elements 12 and 13 have been mounted on an LD stem 10 in such a manner that an optical axis of the light emitted from the light emitting element 12 is intersected with an optical axis of the light emitted from the light emitting element 13 on either the filter 7 or the mirror 8. It is so assumed that the filter 7 has such a property that this filter 7 reflects the light having the wavelength "$\lambda_3$", and passes therethrough the light having the wavelength "$\lambda_2$." As a consequence, the light having the wavelength "$\lambda_2$" is multiplexed with the light having the wavelength "$\lambda_3$", and the multiplexed light is propagated within the multiplexing/demultiplexing device 2 through the same optical axis. When the multiplexed light reaches the filter 6, this multiplexed light is multiplexed with the light having the wavelength "$\lambda_1$" in a similar multiplexing manner. Finally, three sets of the light having the wavelengths "$\lambda_1$", "$\lambda_2$", "$\lambda_3$" are multiplexed with each other, so that the finally multiplexed light is emitted from the optical module. As indicated in FIG. 2, dimensions "x", "y", "z" among the optical axes of the respective wavelengths are determined based upon a thickness and an angle of the glass substrate. The respective optical axes are arranged along one column on the horizontal plane of the substrate in a predetermined interval. As a consequence, if the respective light emitting elements are arranged on the optical axes which are exclusively determined by a design work, then optical multiplexing/demultiplexing operations can be carried out for these wavelengths, so that the multiplexed light can be emitted. As previously described, in accordance with the present invention, since such a multiplexing/demultiplexing device is employed in which the filter and the mirror have been mounted on the front and rear planes of the transparent substrate, the compact optical transmitter module whose structural components are small can be provided. Also, the transparent substrate is once aligned, so that a plurality of filters can be automatically aligned, and thus, there is such a feature that the mounting steps thereof can be largely simplified while high precision is maintained. As previously explained, the optical module of the present invention may have such a function capable of multiplexing the light emitted from the plurality of light sources of the different wavelengths with each other. As a consequence, the optical module can be apparently suitably applied to projectors, but not limited only to these projectors, for instance, may be applied to light sources for wavelength multiplexing communications, reading/writing light sources for optical disks, and further, such a system utilizing light sources having a plurality of wavelengths (colors), for instance, a light source for a biological measuring system. Accordingly, there are such advantages that the apparatuses can be made compact, and the total numbers of structural elements thereof can be reduced. In this example, the optical transmitter module has been exemplified. If the traveling directions of the light are assumed as opposite directions, then the present invention may be realized as an optical receiver module. In this case, the optical multiplexing/demultiplexing device 2 separates the wavelengths.

As represented in FIG. 2, in such a case that a mounting angle of the substrate is selected to be "$\theta_1$", an angle (incident angle) of light entered from either the fiber or the light emitting element 11 with respect to the vertical direction of the front plane of the substrate becomes "$\theta_1$", and another angle "$\theta_2$" of this incident light after being refracted in the substrate substance is given as follows by employing an external refractive index "$n_1$" and a refractive index "$n_2$" of the substrate in accordance with the Snell's law of refraction:

$$\theta_2 = \sin^{-1}(n_1 * \sin\theta_1 / n_2).$$

At this time, a time period "y" of multiple reflections within the substrate is given by "$2d \tan\theta_2$", assuming now that the thickness of the transparent substrate is "d." Also, in such a case that this multiple-reflected light is wavelength-separated by the filter based upon the above-described basic idea, and then, the wavelength-separated light is emitted to a plane located perpendicular to the optical axis when the light is entered, a time period "z" of this light is given as "$2d \sin\theta_2 * \cos\theta_1$." Since the above-described time period "z" corresponds to an interval of elements which are mounted on an element mounting substrate, the above-described values of "d" and "$\theta_1$" must be selected in order to maintain a proper element interval. Generally speaking, there is no opportunity that sizes of elements (for example, as shown in FIG. 2, lateral widths of light emitting elements) become smaller than 100

μm. As a consequence, the value of the time period "z" must be selected to be larger than, or equal to 100 μm.

In accordance with an embodiment of the present invention, with respect to a multi-wavelength transmitter module for transmitting a plurality of light having a plurality of wavelengths by a single optical axis, and also, a multi-wavelength receiver module, it is possible to provide such a compact optical module capable of realizing a high yield, while a total number of structural elements and a total number of mounting steps are largely reduced.

In accordance with the present invention, there are specific effects when systems are made compact and in low cost in various application fields such as data projectors, optical transmission communications, information processing appliances, and biological measuring devices with respect to the multi-wavelength transmitter module for transmitting the plurality of light having the plurality of wavelengths by the single optical axis, and also, the multi-wavelength receiver module, while the total number of structural elements and the total number of mounting steps can be largely reduced.

Other objects, features and advantages of the invention will become apparent from the following description of the embodiments of the invention taken in conjunction with the accompanying drawings.

BRIEF DESCRIPTION OF THE DRAWINGS

FIG. 5A is a diagram for representing such an example that a red/blue light source package has been combined with a green light source package so as to construct the three color light source optical module of the third embodiment.

DETAILED DESCRIPTION OF THE INVENTION

Referring now to drawings, various sorts of embodiments according to the present invention will be described in detail.

First Embodiment

Figure 1:
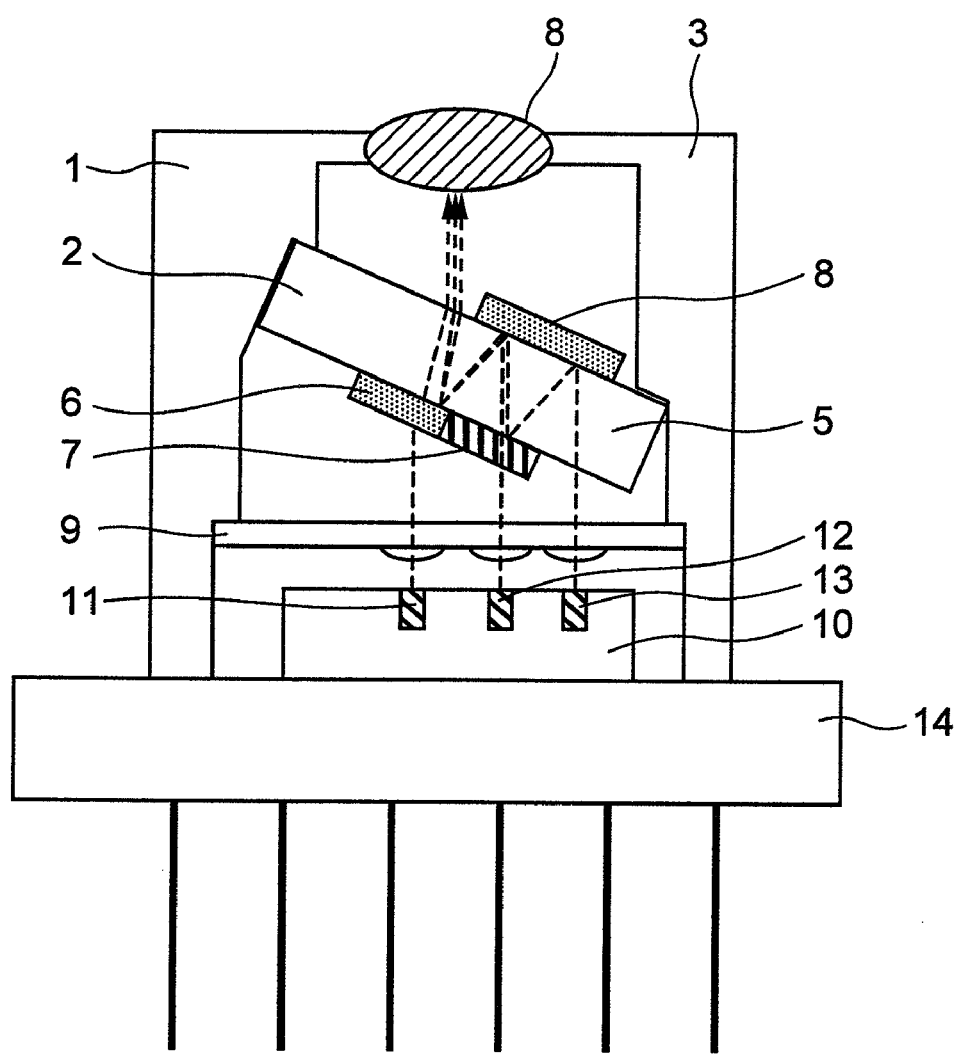
FIG. 1 is a sectional view for schematically showing three color (RGB) light source optical transmitter module according to a first embodiment of the present invention.
Figure 3:
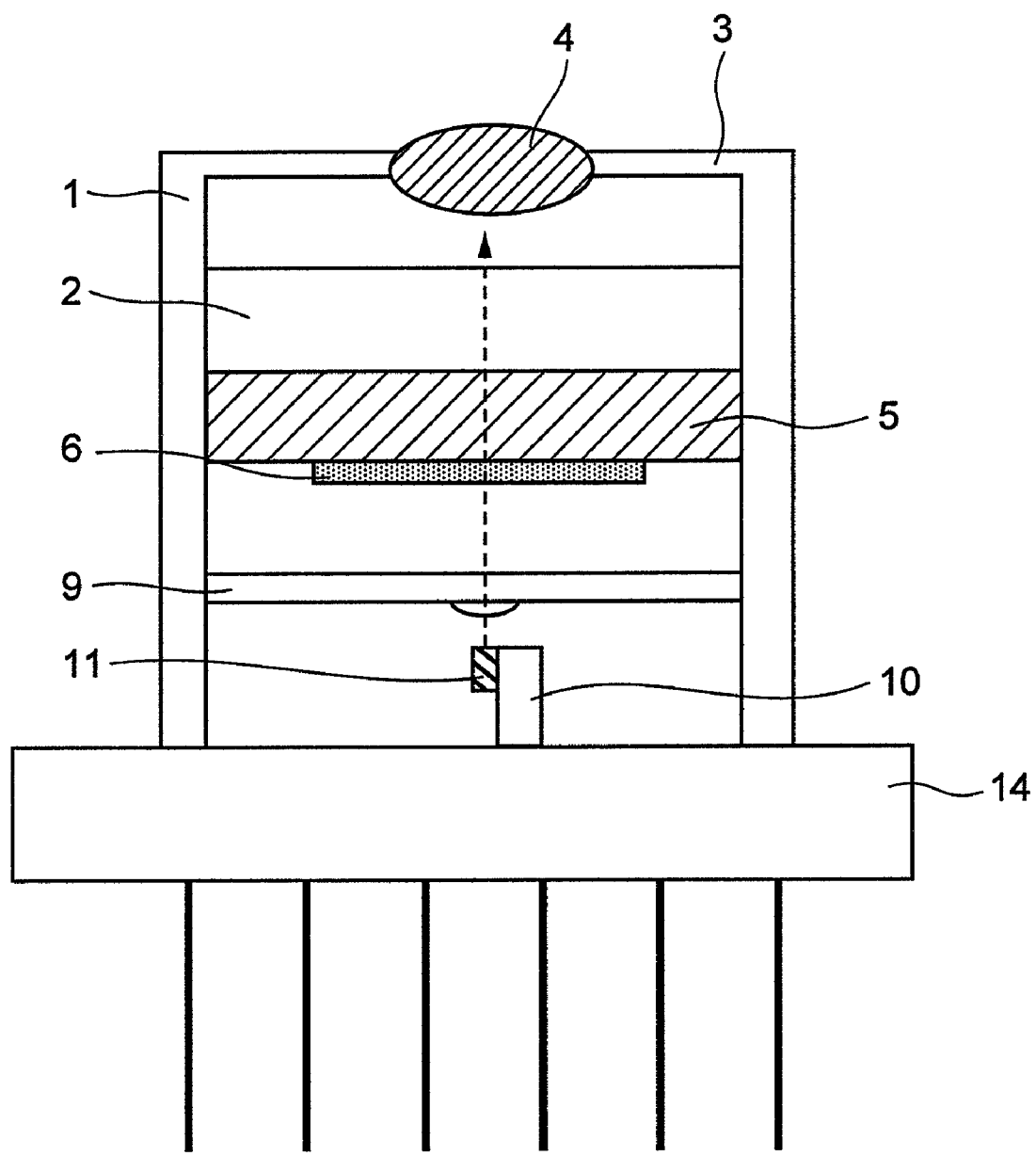
FIG. 3 is a sectional view for indicating the three color (RGB) light source optical transmitter module according to the first embodiment, as viewed at an angle different from the viewing angle of FIG. 1.

FIG. 1 and FIG. 3 are sectional views for showing an optical module according to a first embodiment of the present invention. FIG. 1 is such an example that the present invention has been applied to an optical transmitter module with employment of light sources of three primary colors (R, G, B primary colors).

Figure 2:
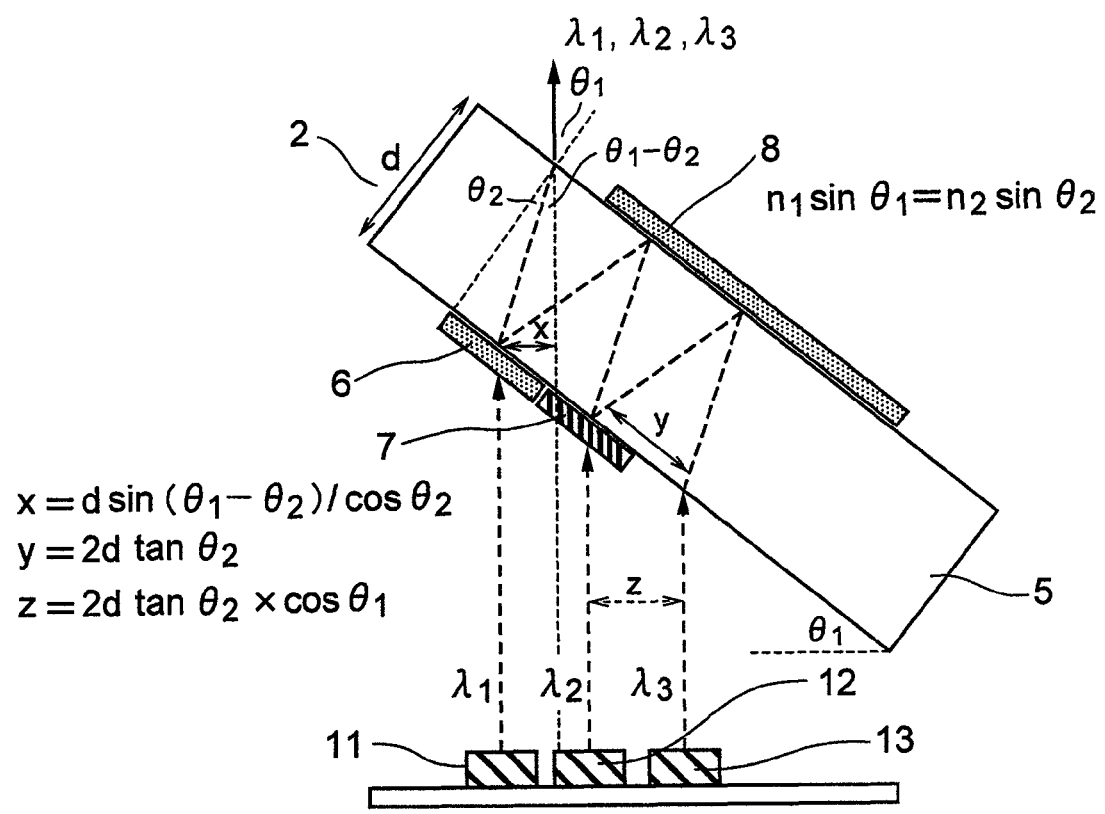
FIG. 2 is an explanatory diagram for explaining operations of the optical transmitter module according to the first embodiment of the present invention.

FIG. 1 shows an example in which the optical transmission module has been mounted in a can package 1. That is, a stem 10 on which laser light sources 11, 12, 13 have been mounted has been mounted on a can stem 14, and an optical multiplexing/demultiplexing device 2 has been mounted on a can cap 3. FIG. 3 is a sectional view of the optical transmitter module shown in FIG. 1, as viewed at a rotation angle of 90 degrees from a view point of FIG. 1. A lens array 9 has been mounted just above laser elements. It is so assumed that waveforms of laser light emitted from the respective laser light sources 11, 12, 13 correspond to blue laser light (for instance, approximately 400 nm to 500 nm), green laser light (for example, approximately 500 nm to 580 nm), and red laser light (for instance, 580 nm to 750 nm), respectively. As the blue laser light source 11, such a semiconductor laser element may be employed which employs InGaN formed on a GaN substrate as an activation layer. As the green laser light source 12, such a semiconductor laser element may be employed which employs InGaN formed on a GaN substrate as an activation layer, or another semiconductor laser element may be employed which employs ZnCdSe formed on a ZnSe substrate as an activation layer. As the red laser light source 13, such a semiconductor laser element may be employed which employs either InGaP or an InGaAlP quantum well formed on a GaAs substrate as an activation layer. These semiconductor laser elements have been mounted on the stem 10 in a predetermined interval in a junction down manner. At this time, the blue semiconductor laser element, the green semiconductor laser element, and the red semiconductor laser element have been arranged from a left side of FIG. 1 in this order from the short light emission wavelength to the long light emission wavelength. In the can cap 3, concave/convex portions capable of mounting both the optical multiplexing/demultiplexing device 2 and the lens array 9 have been provided. The optical multiplexing/demultiplexing device 2 has been manufactured in such a manner that while a transparent glass substrate 5 is employed as a supporting substrate, both a first wavelength selecting filter 6 and a second wavelength selecting filter 7 have been mounted on one surface of the transparent glass substrate 5, whereas both a first mirror 8 and a second mirror 9 have been mounted on another surface thereof which is located opposite to the first-mentioned surface. The optical multiplexing/demultiplexing device 2 was mounted in such a manner that the outer shape of the optical multiplexing/demultiplexing device 2 was aligned to the concave/convex portions of the can cap 3, and then, this optical multipleixng/demultiplexing device 2 was adhered onto the concave/convex portions by using a UV hardening resin. A material of the glass substrate was selected from BK7, and a thickness thereof was set to 1136 μm. While the glass substrate has been mounted in such a manner that an angle of this glass substrate with respect to a plane becomes 20 degrees, symbol "z" indicated in FIG. 2 is selected to be 500 μm, namely, a projection of a pitch of multiple reflections onto the plane is 500 μm. The first and second wavelength selecting filters 6 and 7 have been constituted by a dielectric multilayer film made of $Ta_2O_5$ and $SiO_2$. The first wavelength selecting filter 6 has been formed as a filter (so-called "short-pass filter") having such a property that this short-pass filter 6 can pass therethrough blue light, and can reflect green light and red light. The second wavelength selecting filter 7 has been formed as a short-pass filter having such a property that this short-pass filter 7 can pass therethough blue light and green light, and can reflect red light. In the first mirror 8, the dielectric multilayer film made of $Ta_2O_5/SiO_2$ capable of reflecting the light having the green and red wavelengths has been employed. Alternatively, a metal such as aluminum may be employed in this first mirror 8. The lens array 9 has such a structure that three lenses have been formed on the glass substrate. These three lenses have been designed so as to have a function capable of suppressing widening angles of light emitted from the blue, green, red laser light sources 11, 12, 13, and capable of collimating these emitted light.

Although there is no limitation as to materials of the transparent substrate 5 and the lens array 9 if these materials are transparent with respect to wavelengths to be used, it is preferable to employ such low cost materials having higher processing precision. As the materials capable of satisfying this condition, the material of BK7 has been employed in the first embodiment. Alternatively, other glass materials, dielectric materials, and semiconductor materials may be apparently employed.

Next, a description is made of operations of the optical transmitter/receiver module according to the first embodiment. Concretely speaking, red laser light emitted from the red semiconductor LD (laser diode) element 13 reaches the optical multiplexing/demultiplexing device 2. Since the optical multiplexing/demultiplexing device 2 has been mounted at such an angle which is not equal to a right angle with respect to the optical axis, after the red laser light is refracted based upon a difference in refractive indexes, the refracted red laser light is propagated within the optical multiplexing/demultiplexing device 2, and is reflected on the first mirror 8, and then, the reflected red laser light reaches the second wavelength selecting filter 7. Just under the second wavelength selecting filter 7, the green semiconductor LD element 12 for emitting the green laser light has been mounted. Since the second wavelength selecting filter 7 has such a property that the red laser light is reflected and the green laser light passes therethrough, the red laser light is multiplexed with the green laser light, and then, the multiplexed laser light is propagated within the optical multiplexing/demultiplexing device 2. When this multiplexed laser light has reached the first wavelength selecting filter 6, this multiplexed laser light is further multiplexed with the blue laser light in a similar manner. Finally, the laser light as to the three primary colors (R, G, B) is multiplexed with each other, so that the finally multiplexed laser light is emitted outside the optical transmitter module. It should be understood that emission intensity of the respective R, G, B laser diode elements 11, 12, 13 can be controlled by drive circuits (not shown) connected to the respective later diodes elements 11, 12, 13.

Second Embodiment

Figure 4:
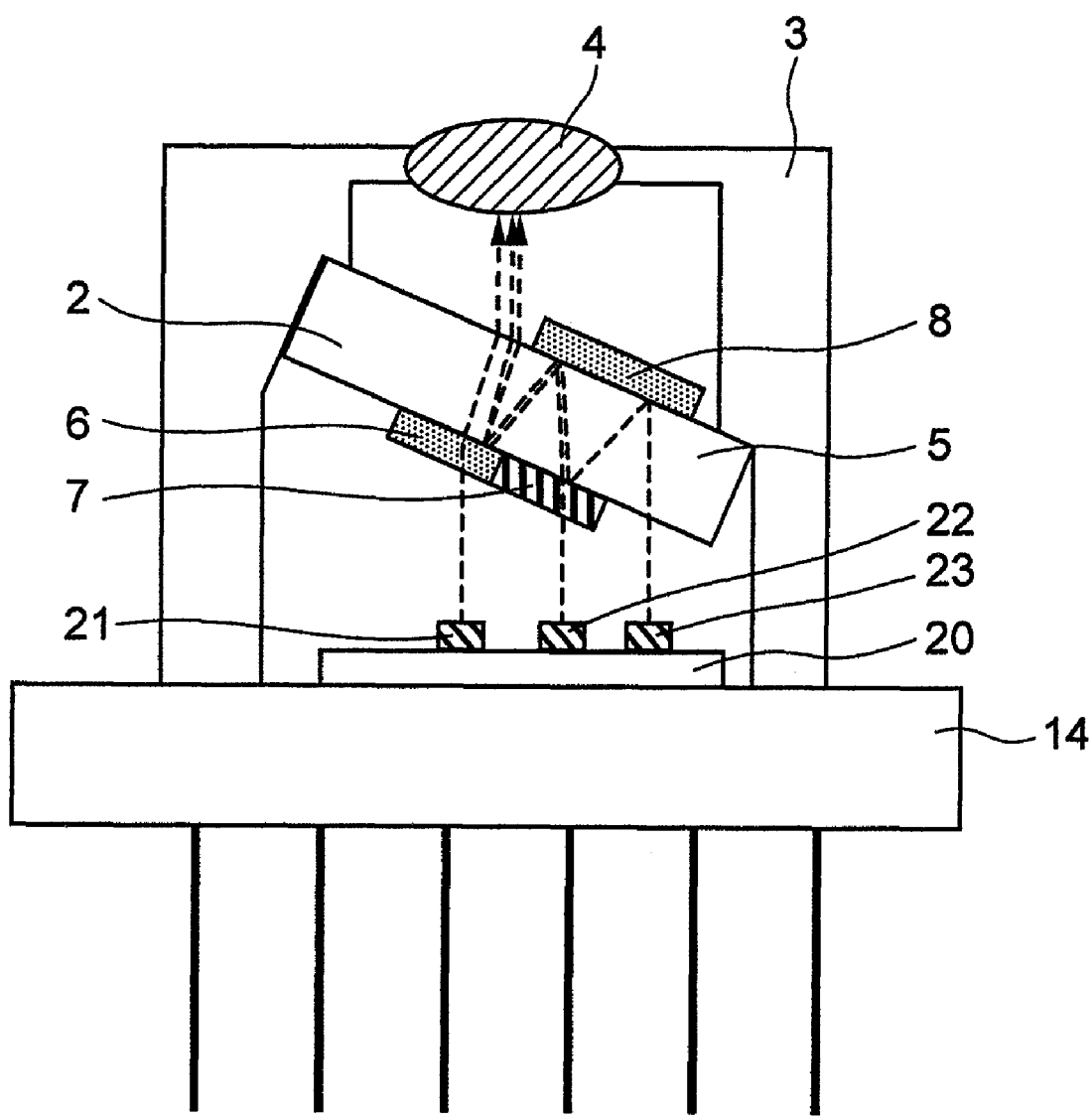
FIG. 4 is a sectional view for indicating an optical module according to a second embodiment of the present invention, namely, a diagram for showing an example in which lens integrated vertically light emitting type LD elements have been employed as light emitting elements.

FIG. 4 is a sectional view for showing an optical module according to a second embodiment of the present invention. The second embodiment is such an example that lens integrated type vertical emission LD elements 21, 22, 23 have been employed in light sources of respective wavelengths so as to construct the optical module. A lens integrated type vertical emission LD element corresponds to such an LD (laser diode) element which emits collimated laser light with respect to a substrate along a vertical direction.

It should be noted that although a basic function of the optical module according to the second embodiment is similar to the basic function of the first embodiment, since the lenses have been integrated on the LD elements 21, 22, 23, the above-described lens array 9 has not been assembled in the optical module.

Third Embodiment

Figure 5A:
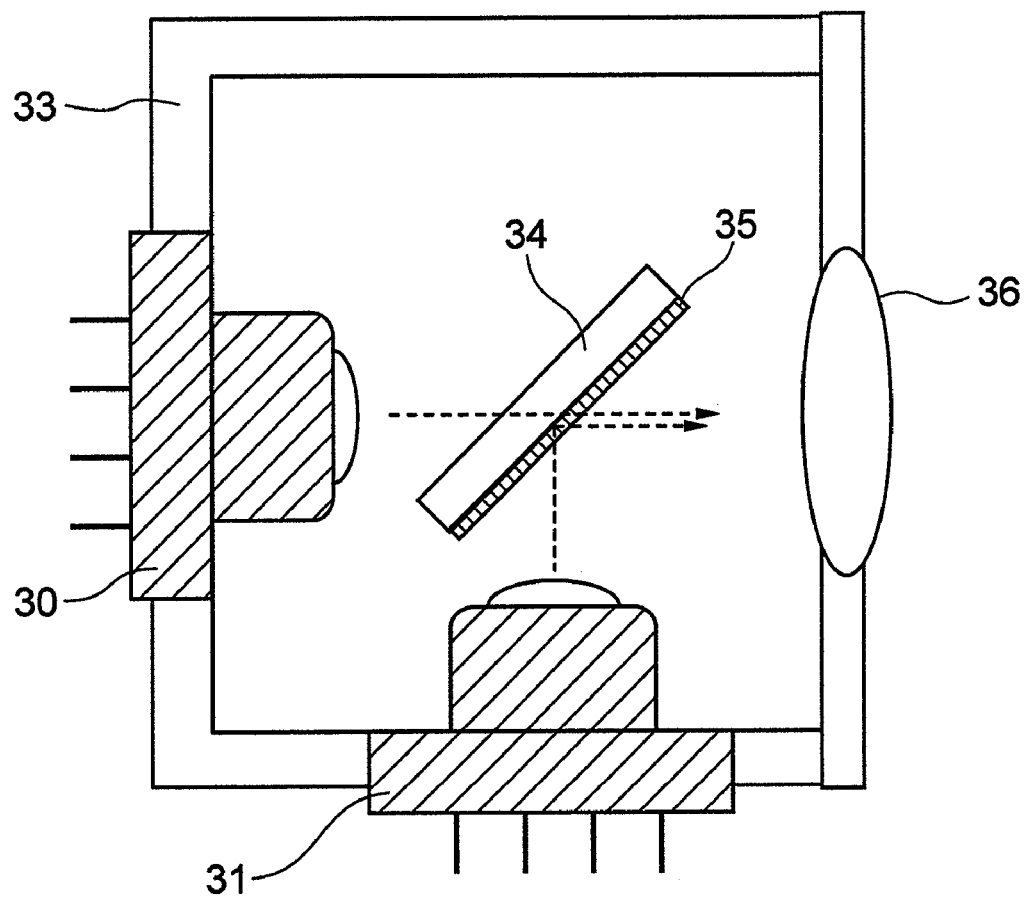
FIG. 5A is a conceptional view for showing an optical module according to a third embodiment of the present invention, namely.
Figure 5B:
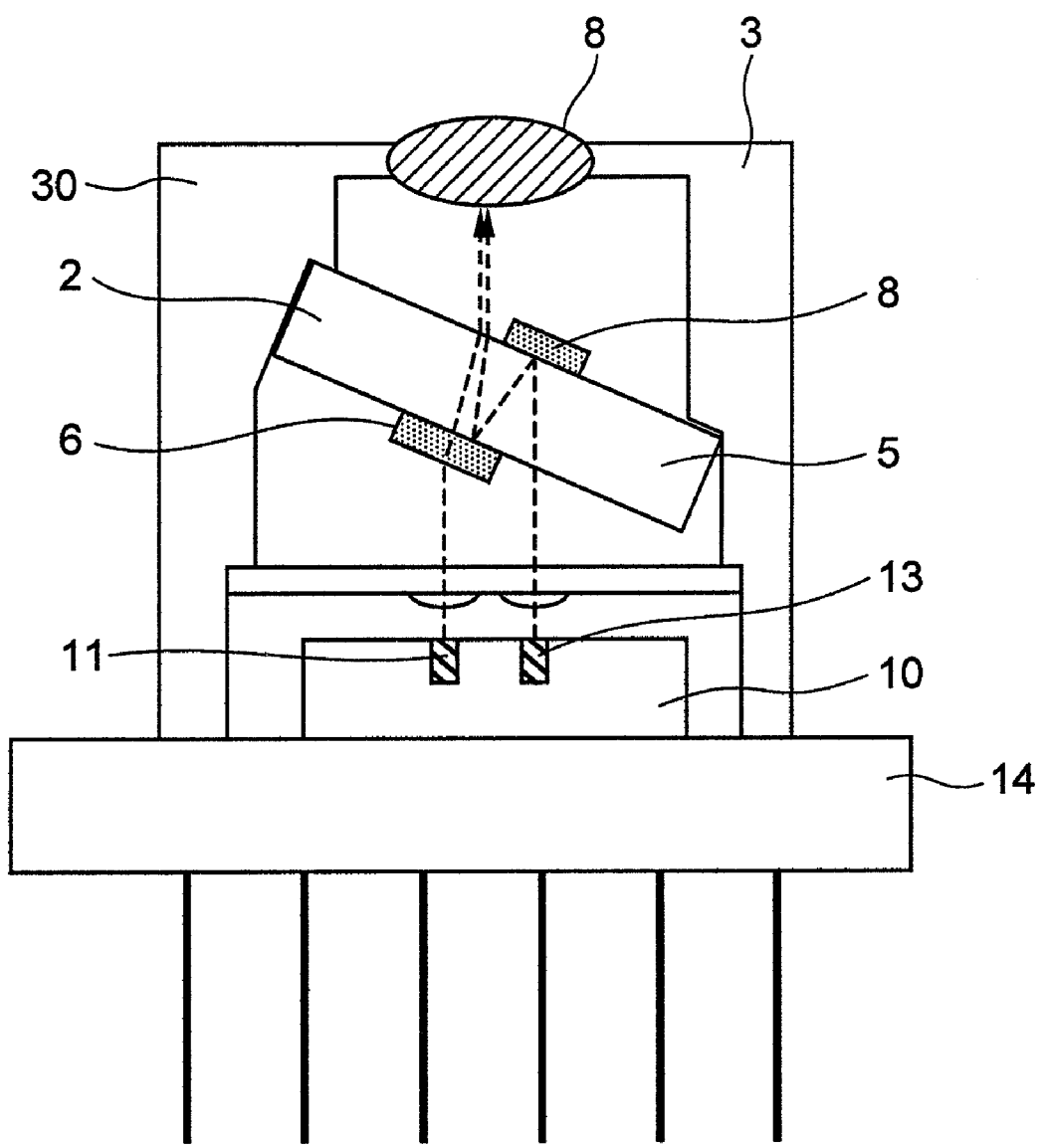
FIG. 5B is a conceptional diagram for indicating a red/blue optical module employed in the third embodiment.

FIG. 5A and FIG. 5B are sectional views for showing an optical module according to a third embodiment of the present invention. The optical module of this third embodiment is such an optical module that a light source can 30 where two laser diode elements having two red and blue wavelengths have been stored in a single can, and another light source can 31 for emitting green laser light having a single wavelength have been assembled in a single package. A structure of the light source can 30 having the two red and blue wavelengths is represented in FIG. 5B. The optical module of the above-described first embodiment has the function capable of multiplexing the laser light of three colors (three wavelengths) with each other, whereas the optical module of this third embodiment has the function capable of multiplexing only the laser light of the two colors (two wavelengths) with each other. In this third embodiment, as to the green color laser light source, the laser module 31 having the following technical idea has been employed: That is, laser light having a wavelength in the vicinity of 1000 nm is converted into secondary higher harmonic waves by utilizing a non-linear effect so as to emit such a laser light having a wavelength in the vicinity of 500 nm. The green color laser light source 31 has been equipped with an excitation laser element, a solid-state laser medium, a laser oscillator, and a wavelength converting element, which are not shown in the drawing. The solid-state laser medium is excited by the excitation laser element. The oscillator oscillates light generated from the solid-state laser medium so as to oscillate laser light. The wavelength converting element converts the laser light oscillated by the oscillator into such a laser light having a desirable wavelength. In this third embodiment, as the solid-state laser medium, crystal of vanadium acid chloride (Nd: $YVO_2$) into which neodymium has been added has been employed, while neodymium emits light having a wavelength of 1064 nm. Alternatively, even if other crystal capable of emitting light having wavelengths in the vicinity of 1000 nm, then the necessary function may be sufficiently realized. Also, as the above-described wavelength converting element, crystal of KTP (KTiOPO$_4$) has been employed. This crystal of KTP (KTiOPO$_4$) has been employed in order that the crystal receives infrared light having wavelengths in the vicinity of 1064 nm which has been excited by the solid-state laser medium, and thus, this crystal generates green light having wavelengths in the vicinity of 532 nm, while the green light corresponds to the second higher harmonic waves of the above-described infrared light.

As indicated in FIG. 5A, a three-wavelength module 33 is operated as follows: That is, a filter 35 mounted on a glass substrate 34 multiplexes the light emitted from the red/blue two-wavelength module with the light emitted from the green color module 31, and then, the multiplexed laser light is emitted via a package lens 36 outside this three-wavelength module 33.

Fourth Embodiment

Figure 6A:
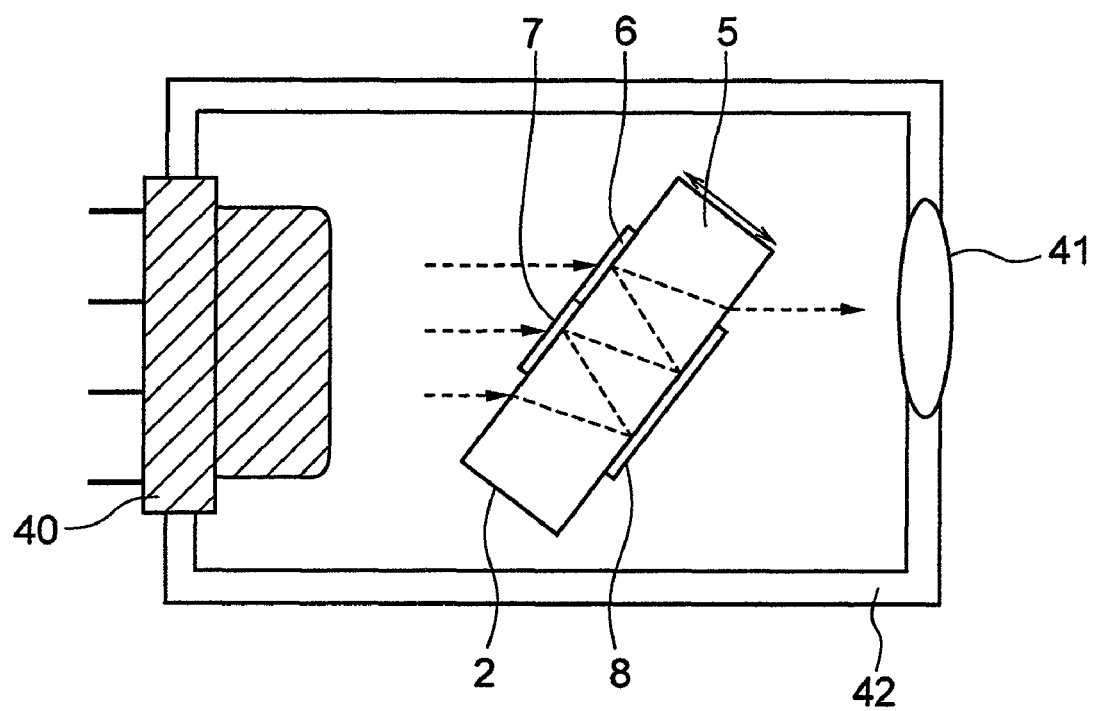
FIG. 6A is a conceptional diagram for showing an optical module according to a fourth embodiment of the present invention.
Figure 6B:
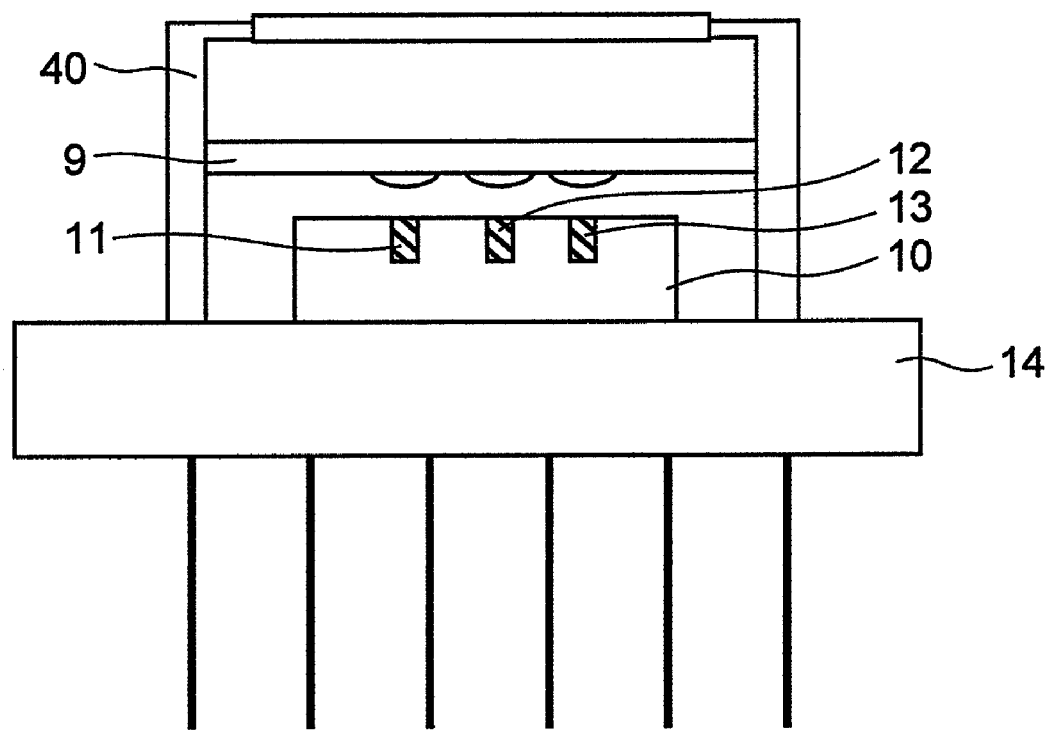
FIG. 6B is a sectional view for representing a can package which is employed in the optical module of the fourth embodiment.

FIG. 6A and FIG. 6B are diagrams for indicating an optical module according to a fourth embodiment of the present invention. In the fourth embodiment, a can package 40, an optical multiplexing/demultiplexing device 2, and a lens 41 have been mounted in a plane type package 42, while LD elements have been mounted in the can package 40, but an optical multiplexing/demultiplexing device has not been mounted in this can package 40. As indicated in FIG. 6B, as to a structure of the can package 40, both a stem 10 on which LD elements 11, 12, 13 have been mounted, and also a lens array 9 have been mounted on a can stem 14.

Fifth Embodiment

Figure 7:
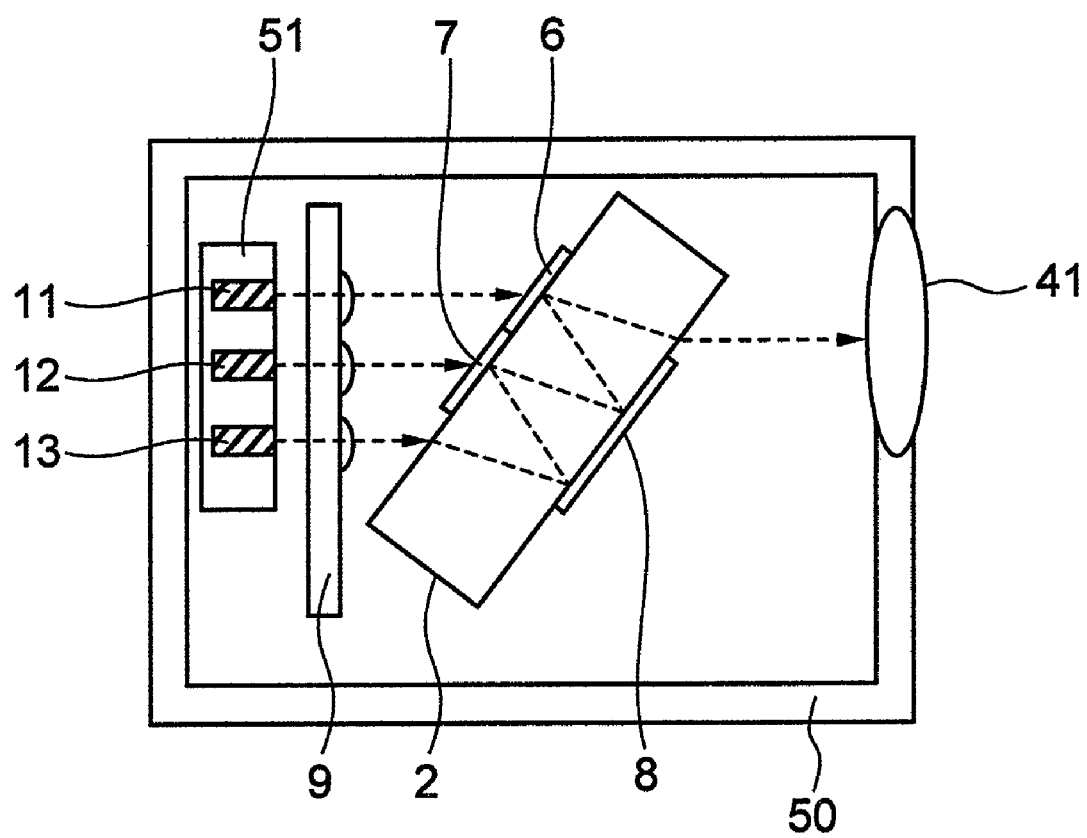
FIG. 7 is a conceptional view for indicating a plane type optical module according to a fifth embodiment of the present invention.

FIG. 7 is a diagram for indicating an optical module according to a fifth embodiment of the present invention. In this fifth embodiment, a stem 51, a lens array 9, an optical wavelength multiplexing/demultiplexing device 2, and a package lens 41 have been mounted on a plane type package 50, while LD elements 11, 12, 13 have been mounted on the above-described stem 51. Concretely speaking, the plane type package 50 may employ a butterfly module, or the like. Although the optical module shown in FIG. 7 can be operated in the three-wavelength mode, even when a total number of wavelengths is further increased, the optical module of this fifth embodiment may be relatively easily operated, which constitutes the feature of the fifth embodiment.

Sixth Embodiment

Figure 8:
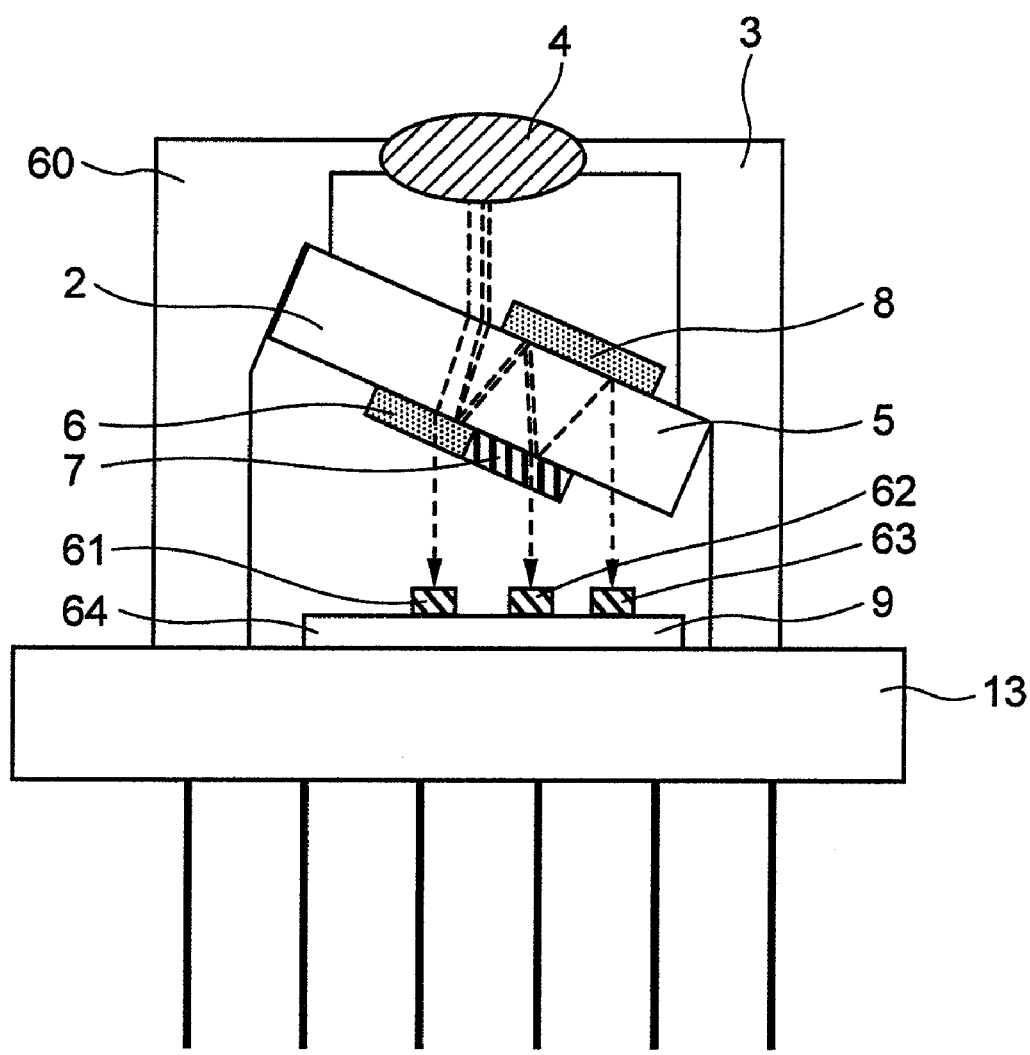
FIG. 8 is a conceptional diagram for indicating a three-wavelength optical receiver module according to a sixth embodiment of the present invention.

FIG. 8 is a diagram for representing an optical module according to a sixth embodiment of the present invention, namely, a diagram for showing one embodiment mode in such a case that the inventive idea of the present invention has been applied to an optical multi-wavelength receiver module. While a basic structure of the optical multi-wavelength receiver module is equal to that of the above-described first embodiment, light receiving elements 61, 62, 63 have been mounted, instead of the light emitting elements 11, 12, 13. It should be understood that operations of the optical multi-wavelength receiver module corresponds to the temporally inverted operations of the optical module described in the above-explained summary. That is to say, such a light entered via the package lens 4 into the optical multi-wavelength receiver module, whose three wavelengths have been optically multiplexed with each other, is wavelength-separated by the first and second wavelength selecting filters 6 and 7 of the optical multiplexing/demultiplexing device 2, and then, a plurality of the wavelength-separated light are entered to these light receiving elements 61, 62, 63, respectively. The above-described sixth embodiment has exemplified that the optical receiver module has been constructed by employing the optical module of the first embodiment. Apparently, optical multi-wavelength receiver modules may be alternatively constructed even if the above-described other optical modules of the second to fifth embodiments are employed.

Seventh Embodiment

Figure 9:
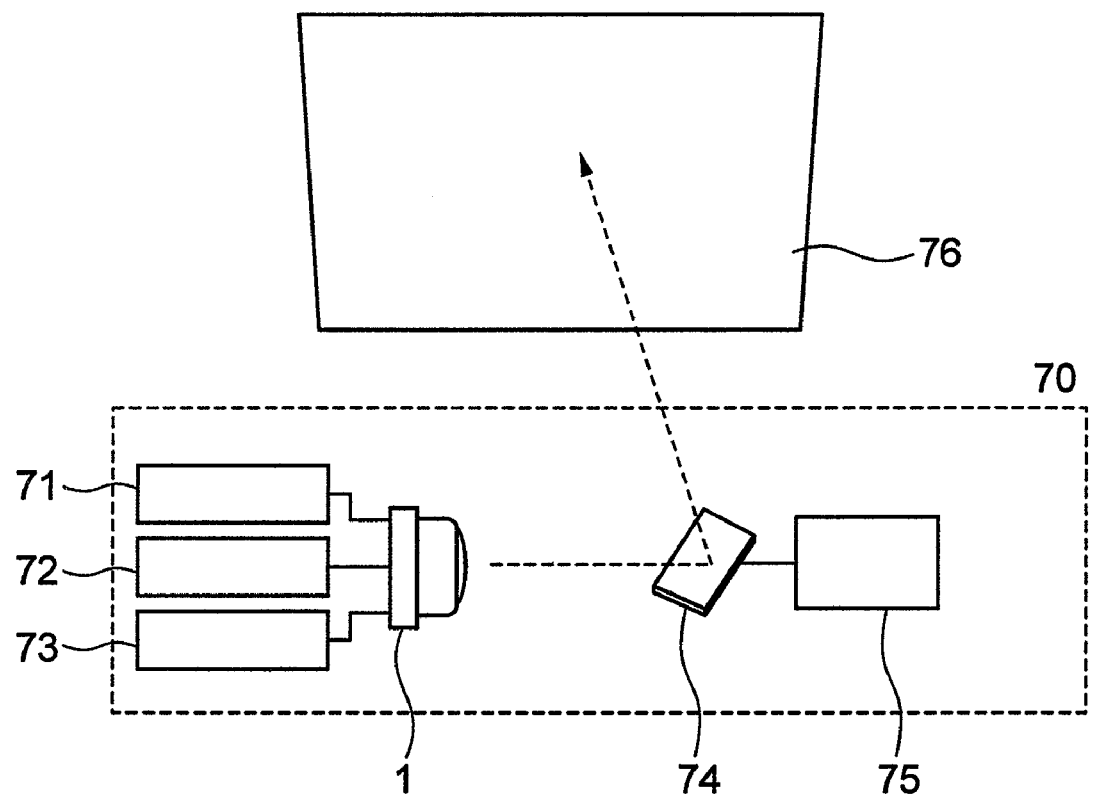
FIG. 9 is a diagram for explanatorily showing a structure and operating conditions in such a case that an optical transmitter module of the present invention has been applied to a compact laser projector.

FIG. 9 is a schematic diagram for illustratively showing a seventh embodiment in such a case that a compact laser projector 70 has been arranged by employing the optical module 1 of the present invention. The compact laser projector 70 has been equipped with drive circuits 71, 72, 73 for driving at least red, green, blue LD elements. In response to drive signals from the drive circuits 71, 72, 73, both intensity and timing as to respective color light outputted for the optical module 1 are controlled. The light emitted from the optical module 1 is reflected on a compact mirror 74, so that the reflected light is projected toward a screen 76 positioned outside the laser projector 70. Motion of the compact mirror 74 is controlled by a mirror driving apparatus 75. In order to represent an image, such a laser light whose the respective colors (RGB) have been modulated based upon intensity and time is two-dimensionally scanned in a high speed on the screen 76.

Eighth Embodiment

Figure 10:
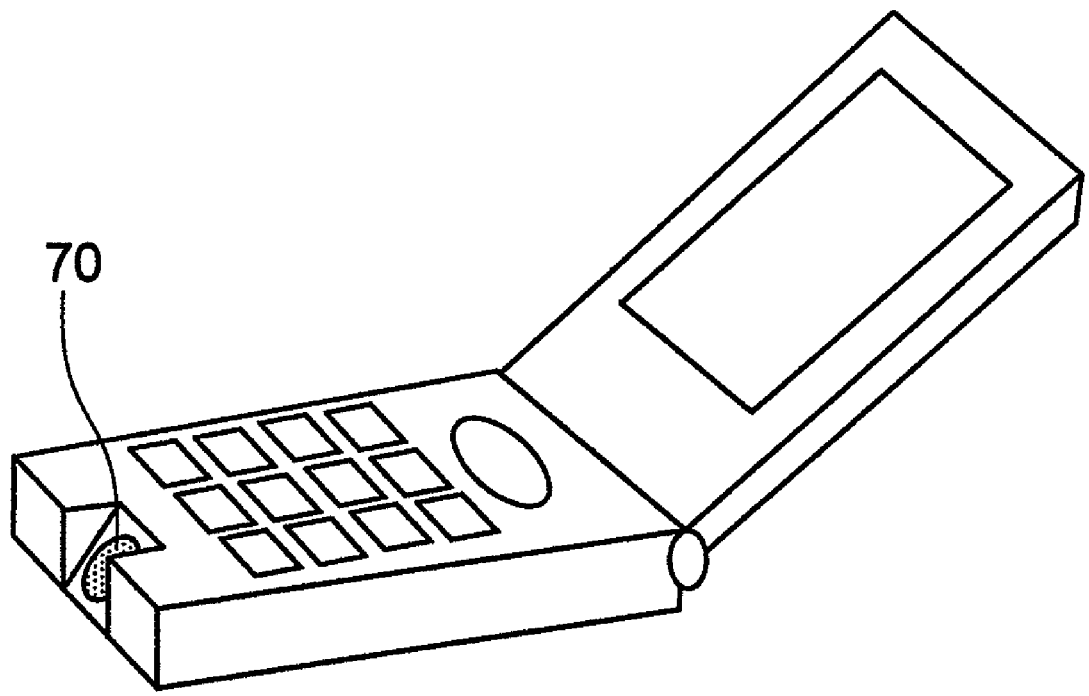
FIG. 10 is a conceptional diagram for indicating an example in which the compact laser projector shown in FIG. 10 has been assembled in a portable telephone.

FIG. 10 illustratively shows an example in which the compact laser projector 70 described in the seventh embodiment has been assembled in a portable telephone. As apparent from the foregoing descriptions, as apparatuses into which the compact laser projector 70 is assembled, not only a portable telephone, but also other appliances may be assembled, for example, mobile computers, portable game machines, portable audio appliances, electronic dictionaries, and the like. Alternatively, these appliances may be apparently constructed as independent apparatuses as compact projectors.

Ninth Embodiment

Figure 11:
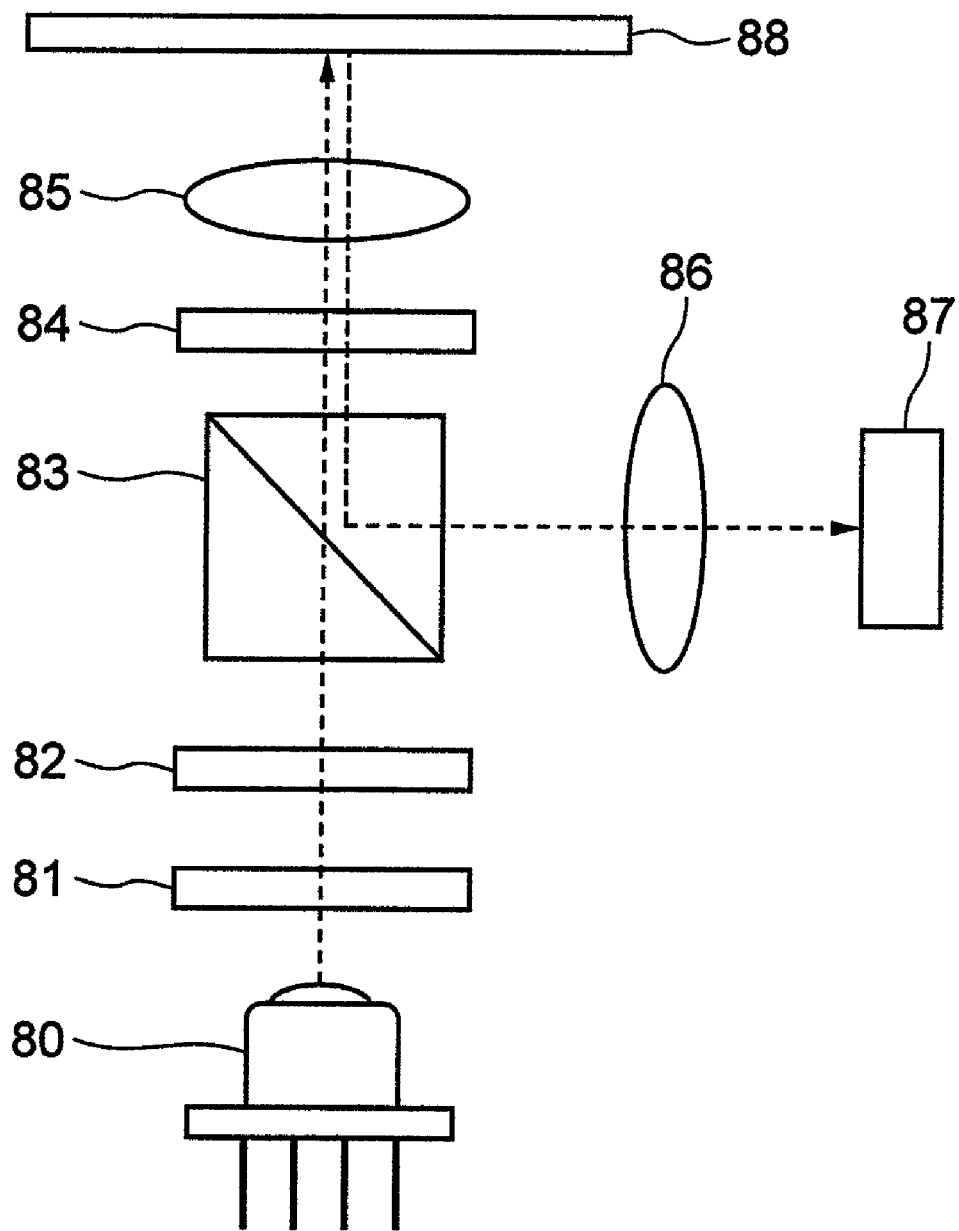
FIG. 11 is a diagram for explanatorily indicating a structure and operating conditions in such a case that the optical transmitter module of the present invention has been applied to a light source designed for an optical disk pick-up.

FIG. 11 is a diagram for representing a ninth embodiment in such a case that the optical module of the present invention has been applied to an optical disk reading apparatus.

Laser light emitted from an optical multi-wavelength transmitter module 80 is entered via a diffraction grating 81, a ½ wavelength plate 82, a beam splitter 83, a ¼ wavelength plate 84, and a lens 85 onto an information recording plane formed on an optical disk 88. Laser light reflected on the optical disk 88 is polarized/separated by the beam splitter 83, and then, entered via another lens 86 to a light receiving element 87.

In the multi-wavelength transmitter module 80, a red laser element having a wavelength of 780 nm has been mounted as a CD reading-purpose LD element; a red laser element having a wavelength of 650 nm has been mounted as a DVD reading-purpose LD element; and a blue laser element having a wavelength of 405 nm has been mounted as a Blue-ray disk reading-purpose element. Normally, while these laser light sources are separately prepared, red laser light, green laser light, and blue laser light are optically multiplexed with each other by employing a dichroic prism. However, in accordance with this ninth embodiment, only one optical multi-wavelength transmitter module 80 may be merely employed, so that the optical system of the optical disk reading apparatus can be largely simplified.

Tenth Embodiment

Figure 12A:
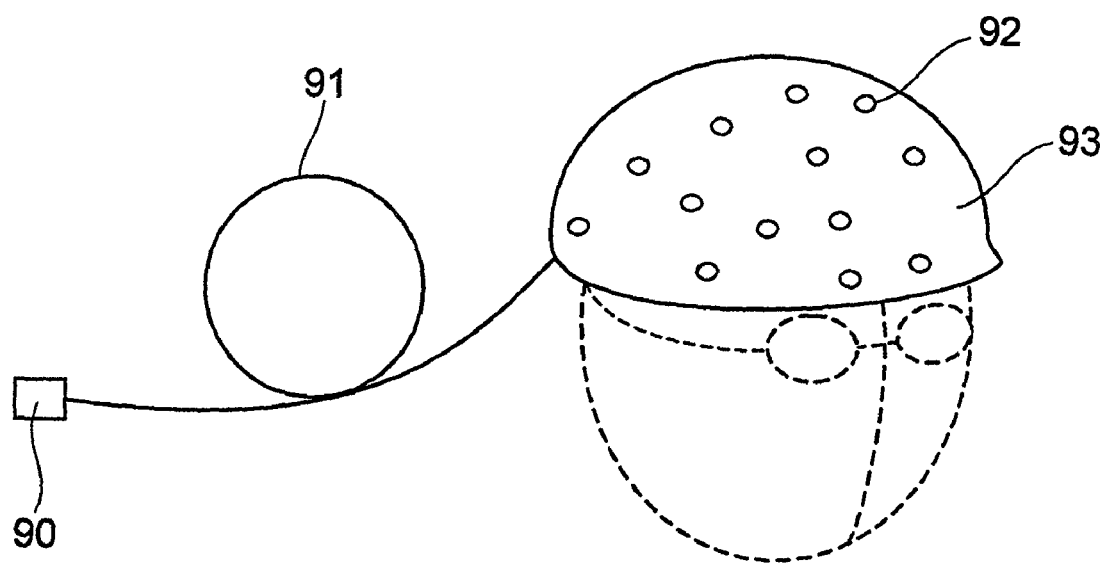
FIG. 12A is a diagram for explanatorily indicating a structure and operating conditions in such a case that the optical transmitter module of the present invention has been applied to a light source for a brain function measuring-purpose infrared spectroscopic apparatus.
Figure 12B:
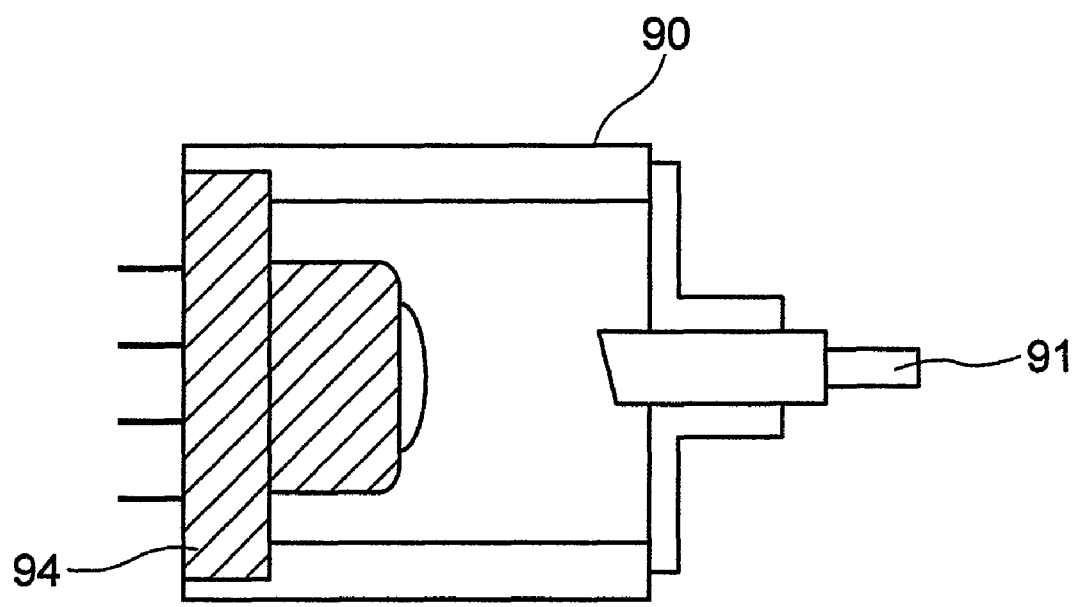
FIG. 12B is a diagram for schematically representing a structure of a fiber coupling type optical transmitter module which is employed in the brain function measuring-purpose infrared spectroscopic apparatus shown in FIG. 12A.

FIG. 12A and FIG. 12B are diagrams for illustratively showing a tenth embodiment of the present invention in such a case that the optical module of the present invention has been applied to a brain function measuring-purpose infrared spectroscopic apparatus (so-called "brain topography apparatus"). A basic function of this brain function measuring-purpose infrared spectroscopic apparatus is given as follows: That is, oxygen concentration within brain blood vessels is measured by absorptions of laser light. Laser light emitted from an optical multi-wavelength transmitter module 90 is conducted via a fiber 91 to a probe holder 93, and then, the conducted laser light is projected from the probe holder 93. After the projected laser light has been absorbed by a predetermined absorption level within a biological body, the absorbed laser light is detected by a light receiving element 92 mounted on the probe holder 93. At this time, oxygen concentration within blood vessels is measured based upon intensity ratios of the respective wavelengths of the laser light. A concrete shape of the multi-wavelength transmitter module 90 is illustratively shown in FIG. 12B. These sorts of LD elements having wavelengths of 705 nm, 754 nm, 830 nm, which are suitable for biological measurements, have been mounted on a can package 94.

Since the optical module of the present invention is employed in the light source of the head mounting type probe holder 93 utilized in the biological measurement, cost and dimensions of the spectroscopic apparatus can be reduced. Also, since the spectroscopic apparatus is made simpler and compact, there is another effect that oppression senses felt by persons under examination can be reduced.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical transmitter module comprising:
    an optical element mounting substrate in which at least a first light emitting element having a use wavelength of "λ1" and a second light emitting element having a use wavelength of "λ2" different from said use wavelength "λ1" have been mounted on a mounting substrate; and
    an optical multiplexing/demultiplexing device containing at least a first wavelength selecting filter and a mirror which is separated from said first wavelength selecting filter by a predetermined distance, and is positioned opposite and parallel with respect to said first wavelength selecting filter; wherein:
    said optical multiplexing/demultiplexing device is fixed on a package for storing thereinto both said optical element mounting substrate and said optical multiplexing/demultiplexing device under such a condition that said optical multiplexing/demultiplexing device is inclined with respect to an element mounting plane of said mounting substrate at an angle of "θ" (note that angle "θ" is not equal to 2Nπ. symbol "N"=0, 1, 2, - - - ); and wherein:
    first emission light from said first light emitting element is entered to said optical multiplexing/demultiplexing device; the entered first emission light is reflected on said mirror; and the reflected first emitting light is reflected on said first wavelength selecting filter; second emission light from said second light emitting element is entered to said optical multiplexing/demultiplexing device; and said entered second emission light is multiplexed with said reflected first emission light at said first wavelength selecting filter.

2. An optical transmitter module as claimed in claim 1 wherein:
    a third light emitting element having a light emission wavelength of "λ3" (note that wavelengths λ1, λ2, λ3 are not each to each other) is mounted on said optical element mounting substrate;
    a second wavelength selecting filter having a wavelength selecting characteristic which is different from that of said first wavelength selecting filter is separated from said mirror by a predetermined distance, and is provided opposite and parallel to said mirror;
    first emission light from said first light emitting element is entered to said optical multiplexing/demultiplexing device; the entered first emission light is reflected on said mirror; and the reflected first emitting light is reflected on said first wavelength selecting filter; second emission light from said second light emitting element is entered to said optical multiplexing/demultiplexing device; and said entered second emission light is multiplexed with said reflected first emission light at said first wavelength selecting filter; and wherein:
    said multiplexed first emission light is reflected on said mirror, and the reflected first emission light is reflected on said second wavelength selecting filter; third emission light from said third light emitting element is entered to said optical multiplexing/demultiplexing device; and then, said entered third emission light is multiplexed with said first reflected emission light at said second wavelength selecting filter.

3. An optical transmitter module as claimed in claim 1 wherein:
    said first and second light emitting elements are edge emitting type laser diodes; and a surface side of said laser diode on which crystal has grown is mounted to be adhered to said mounting substrate in a junction down mounting manner so as to mount said laser diodes on said mounting substrate.

4. An optical transmitter module as claimed in claim 1 wherein:
    a lens array in which a plurality of lenses have been formed on a transparent substrate is provided between said mounting substrate and said optical multiplexing/demultiplexing device;
    a total number of said plural lenses and arrangements of said plural lenses are determined in such a manner that the respective lenses of said lens array are provided in an one-to-one corresponding relationship with respect to said first and second light emitting elements; and
    said respective lenses have such a function capable of suppressing at least widening of the first and second emission light from said first and second light emitting elements, or capable of collimating said first and second emission light.

5. An optical transmitter module as claimed in claim 1 wherein:
    said optical multiplexing/demultiplexing device is comprised of:
    a substrate having one pair of parallel planes, which is made of a material having an optical transmission characteristic with respect to a use wavelength of passing light;
    at least one sort of filter fixed on one of said paired parallel planes; and a mirror fixed on the other plane of said paired parallel planes.

6. An optical transmitter module as claimed in claim 5 wherein:
the material of said substrate is selected from any one of amorphous glass, sapphire crystal, quartz crystal, and silicon.

7. An optical transmitter module as claimed in claim 1 wherein:
said optical element mounting substrate and said optical multiplexing/demultiplexing device are stored into said package;
said package is a metal can package; and
concave/convex portions for fixing thereon said optical multiplexing/demultiplexing device has been provided on an inner wall of said package.

8. An optical transmitter module as claimed in claim 2 wherein:
while said first, second, third light emitting elements are mounted on said mounting substrate, assuming now that emission wavelengths of said first to third light emitting elements are defined as "$\lambda 1$", "$\lambda 2$", "$\lambda 3$", respectively, when there is such a relationship of either "$\lambda 1 < \lambda 2 < \lambda 3$" or "$\lambda 1 > \lambda 2 > \lambda 3$", said first to third light emitting elements are mounted on said mounting substrate, which are arrayed in this order.

9. An optical transmitter module as claimed in claim 2 wherein:
respective filters which constitute a filter array of said optical multiplexing/demultiplexing device correspond to edge filters having such a filtering characteristic that said edge filters cause light to pass therethrough, which has a wavelength longer than, or equal to a desirable separation wavelength within a use wavelength range of all of said first to third light emitting elements, or another wavelength shorter than, or equal to said desirable separation wavelength, and also, said edge filters cause light having other wavelengths to be reflected; and wherein:
said respective edge filters provided in the filter array have been mounted either in an increment order or a decrement order, in view of a large/small relationship among values of said separation wavelength range of the respective edge filters.

10. An optical transmitter module as claimed in claim 2 wherein:
said first, second, and third light emitting elements are semiconductor lasers which emit R (red) laser light, G (green) laser light, and B (blue) laser light, respectively.

11. An optical transmitter module as claimed in claim 2 wherein:
in an optical transmitter module for optically multiplexing red light, green light, and blue light emitted from three sorts of light sources so as to emit the multiplexed light with one optical axis,
said optical transmitter module is comprised of:
a red/blue light source package;
a green light source package; and
a filter; and wherein:
said green light source package is a laser light source for emitting green laser light by converting a wavelength by employing a secondary higher harmonic wave; and
said red/blue light source package employs a red laser element and a blue laser element as light emitting elements.

12. In an optical multi-wavelength receiver module for demultiplexing wavelength-multiplexed light every wavelength and for sensing the demultiplexed light by at least two light receiving elements,
the optical receiver module is comprised of:
a light receiving element mounting substrate on which at least said two light receiving elements have been mounted;
an optical multiplexing/demultiplexing device containing at least a first wavelength selecting filter and a mirror which is separated from said first wavelength selecting filter by a predetermined distance, and is positioned opposite and parallel with respect to said first wavelength selecting filter; and
a package which stores thereinto at least said light receiving element mounting substrate and said optical multiplexing/demultiplexing device; wherein:
said optical multi-wavelength receiver module causes incident light from an external source to enter into a plane of said wavelength selecting filter at an angle of "$\theta 1$" (note that angle "$\theta 1$" is not equal to 90 degrees), and to separate light having different wavelengths from each other in such a stage during which the incident light is reflected in a multiplexing mode in a zig-zag manner between said wavelength selecting filter and said mirror; and
both said wavelength selecting filter and said mirror of said optical multiplexing/demultiplexing device have been fixed within said package under such a condition that said filter plane and said mirror plane are inclined with respect to the element mounting plane of said light receiving element mounting substrate by an inclination angle of "$\theta 2$" (note that angle "$\theta 2$" is not equal to $2N\pi$. symbol "N"=0, 1, 2, - - - ).

* * * * *